US008839114B1

(12) United States Patent
Glendinning et al.

(10) Patent No.: US 8,839,114 B1
(45) Date of Patent: Sep. 16, 2014

(54) SYSTEM, METHOD, AND COMPUTER PROGRAM FOR GENERATING A GRAPHICAL REPRESENTATION OF AT LEAST A PORTION OF A SYNCHRONIZED NETWORK MODEL

(75) Inventors: Johnston Harden Graham Glendinning, Bradford-on-Avon (GB); Valery Eysman, Thornill (CA); Simon Dowling, Bude (GB)

(73) Assignee: Amdocs Software Systems Limited, Dublin (IE)

( * ) Notice: Subject to any disclaimer, the term of this patent is extended or adjusted under 35 U.S.C. 154(b) by 413 days.

(21) Appl. No.: 12/834,851

(22) Filed: Jul. 12, 2010

(51) Int. Cl.
*G06F 17/00* (2006.01)

(52) U.S. Cl.
USPC ........... 715/735; 715/734; 715/736; 707/722; 707/769

(58) Field of Classification Search
CPC ....... H04L 41/12; H04L 41/14; H04L 41/147; H04L 41/22
See application file for complete search history.

(56) References Cited

U.S. PATENT DOCUMENTS

| | | | |
|---|---|---|---|
| 6,970,919 B1 * | 11/2005 | Doi et al. | 709/220 |
| 2002/0035625 A1 * | 3/2002 | Tanaka | 709/223 |
| 2007/0043752 A1 | 2/2007 | Zacharla et al. | 707/101 |
| 2007/0058570 A1 * | 3/2007 | Singh et al. | 370/254 |
| 2008/0291944 A1 | 11/2008 | Liu | 370/503 |

* cited by examiner

*Primary Examiner* — Stephen Hong
*Assistant Examiner* — Keith Bloomquist
(74) *Attorney, Agent, or Firm* — Zilka-Kotab, PC

(57) ABSTRACT

A system, method, and computer program product are provided for generating a graphical representation of at least a portion of a synchronized network model. In use, a network model of a network is identified. Additionally, an inventory model of the network is identified. Further, the network model and the inventory model are synchronized to identify differences between the network model and the inventory model. Moreover, a graphical representation of a variant model associated with the network is generated, utilizing the differences between the network model and the inventory model, where the variant model includes the network model with the differences between the network model and the inventory model.

24 Claims, 7 Drawing Sheets

SYSTEM, METHOD, AND COMPUTER PROGRAM FOR GENERATING A GRAPHICAL REPRESENTATION OF AT LEAST A PORTION OF A SYNCHRONIZED NETWORK MODEL

FIELD OF THE INVENTION

The present invention relates to network models, and more particularly to synchronizing network models.

BACKGROUND

Network models have generally included representations of objects in a network. Accordingly, synchronization of these network models has traditionally been provided for determining differences in various network models, such that the differences in the objects represented by such network models may be identified. Unfortunately, current techniques utilized for presenting results of network model synchronizations have exhibited various limitations.

Just by way of example, results generated from synchronization of network models have conventionally been presented as a textual list describing differences between the network models. Users have therefore generally been required to read and understand the words describing the differences between the network models in order to determine a desired course of action to be taken with respect to the network models. There is thus a need for addressing these and/or other issues associated with the prior art.

SUMMARY

A system, method, and computer program product are provided for generating a graphical representation of at least a portion of a synchronized network model. In use, a network model of a network is identified. Additionally, an inventory model of the network is identified. Further, the network model and the inventory model are synchronized to identify differences between the network model and the inventory model. Moreover, a graphical representation of a variant model associated with the network is generated, utilizing the differences between the network model and the inventory model, where the variant model includes the network model with the differences between the network model and the inventory model.

DETAILED DESCRIPTION

Figure 1:
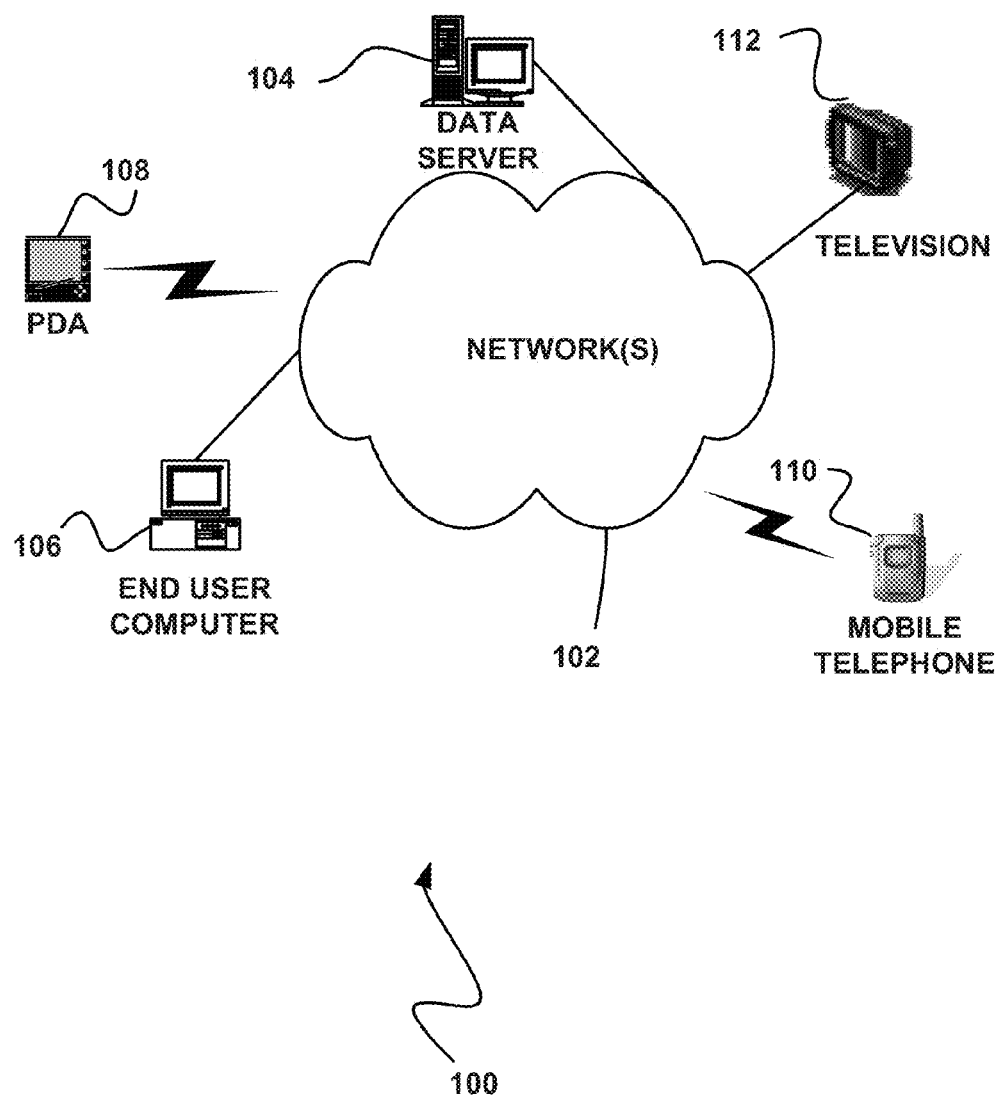
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
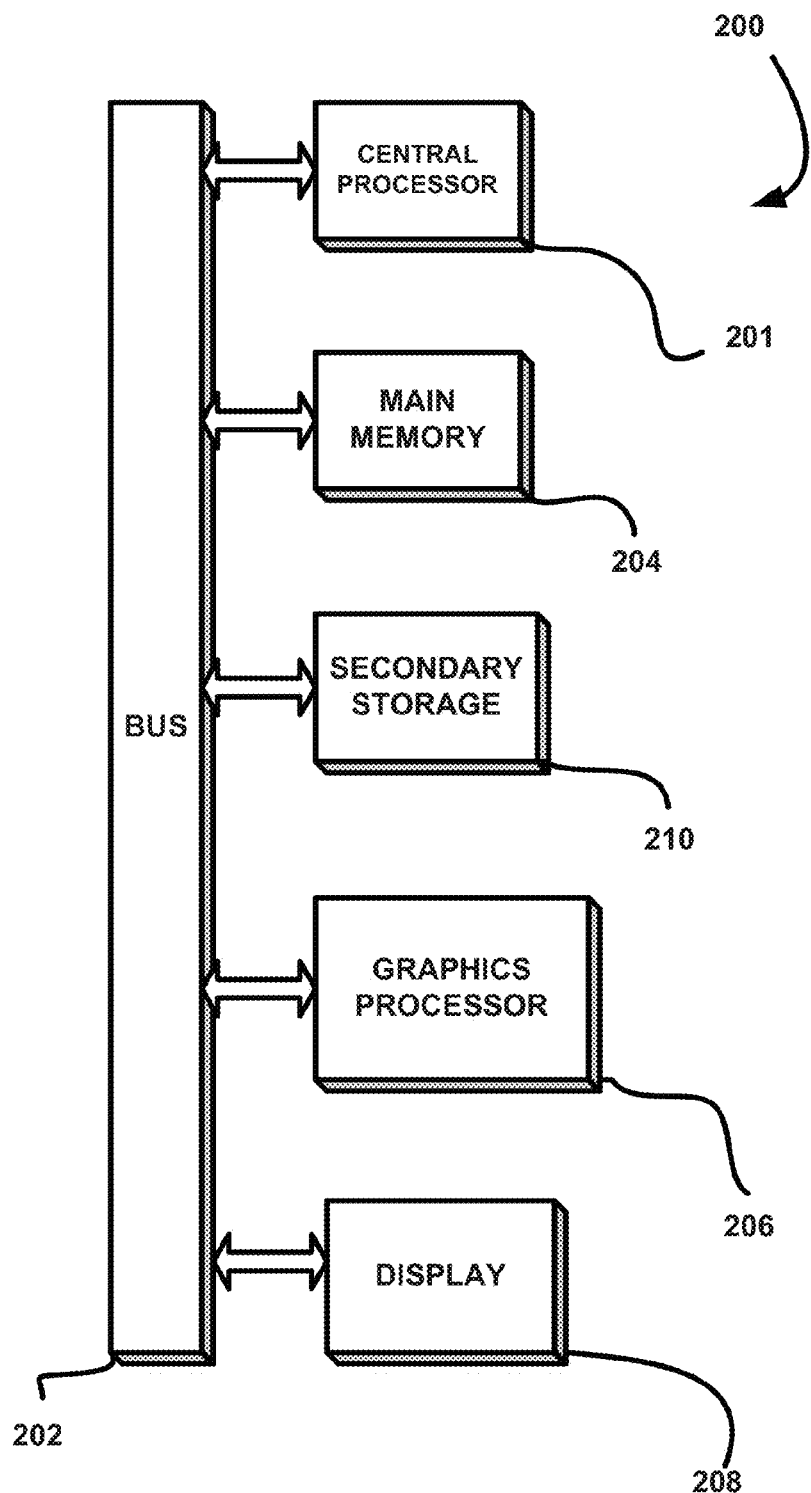
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
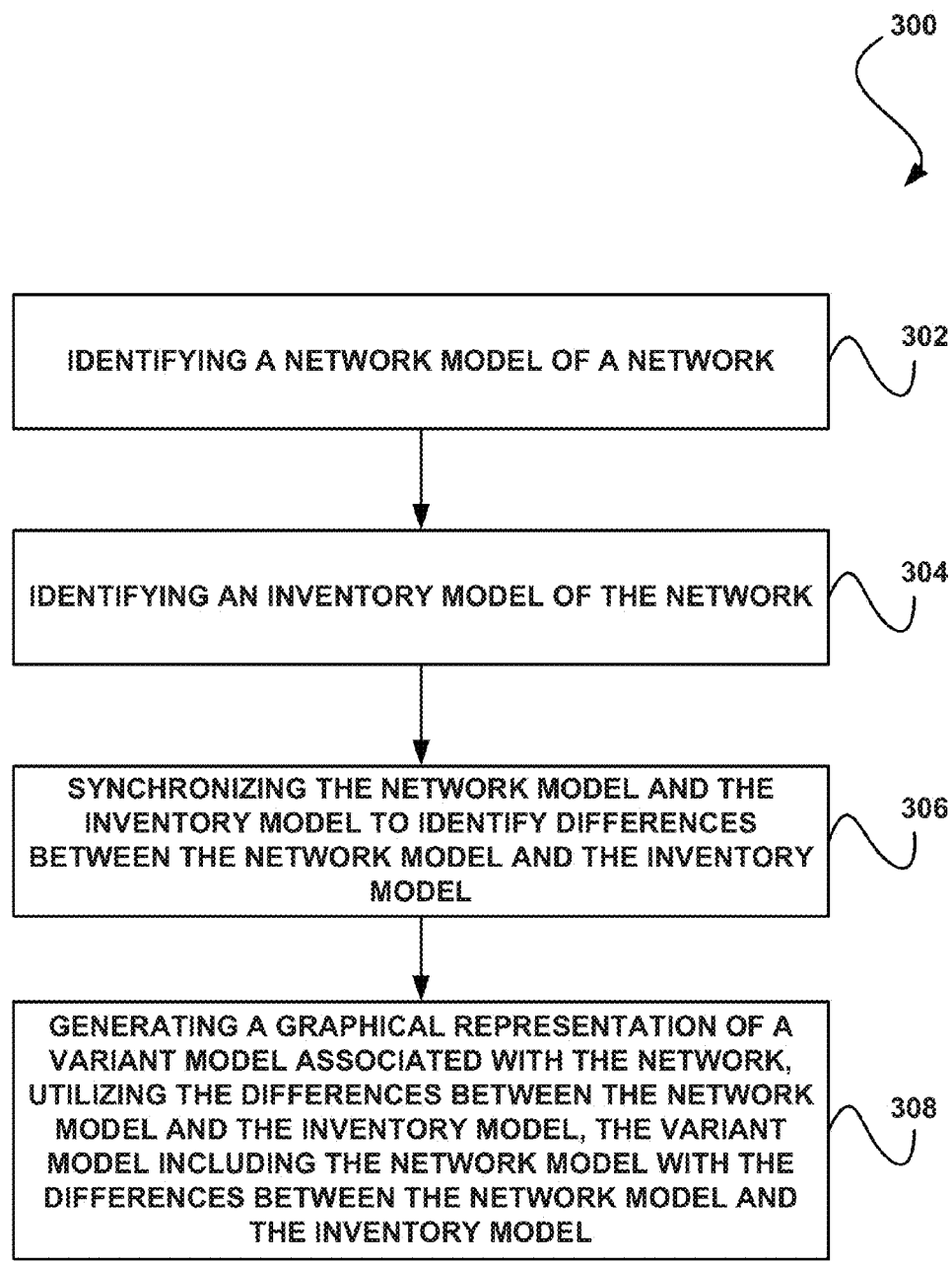
FIG. 3 illustrates a method for generating a graphical representation of at least a portion of a synchronized network model, in accordance with another embodiment.

FIG. 3 illustrates a method 300 for generating a graphical representation of at least a portion of a synchronized network model, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a network model of a network is identified. Also, as shown in operation 304, an inventory model of the network is identified. With respect to the present description, the network includes any network capable of being modeled. For example, in various embodiments the network may include a telecommunications network, a local area network (LAN), a wireless network, a wide area network (WAN), and any of the other networks described above with respect to FIG. 1, etc. Optionally, the network may be provided by a single service provider.

To this end, the network model and the inventory model may each include a different representation, depiction, inventory, view, etc. of the network. Optionally, the network model and the inventory model may each include a representation of a plurality of objects included in the network. Such objects may include nodes (e.g. devices, such as the devices described above with respect to FIGS. 1 and/or 2), circuits, services, shelves, slots, cards, ports, and/or any other components of the network. For example, changes in the network may be planned using the inventory model (and thus depicted using the inventory model), but carried out differently in the network, where the network model depicts the actual state of the network, such that the network model and the inventory model may be different.

It should be noted that the network model and the inventory model may each be identified in any desired manner. In one embodiment, the network model may be identified from a first source. In another embodiment, the inventory model may be identified from a second source.

For example, such first source and second source may be different sources storing, managing, maintaining, etc. an associated model of the network. As another example, the first source may be a first system for which the method 300 is being performed, whereas the second source may be another system external to the first system.

Additionally, the network model and the inventory model are synchronized to identify differences between the network model and the inventory model, as shown in operation 306. With respect to the present description, synchronizing the network model and the inventory model may include any comparison of the network model and the inventory model that is capable of identifying the differences between the network model and the inventory model.

For example, synchronizing the network model and the inventory model may include identifying a first list of objects from the network model and a second list of objects from the inventory model. The first list of objects may list objects in the network as represented by the network model, and the second list of object may list objects in the network as represented by the inventory model. Since the network model and the inventory model may be different, as noted above, the corresponding first list and second list may list different objects. As an option, the first list of objects and the second list of objects may also list attributes of the listed objects.

In one embodiment, the first list of objects and the second list of objects may be identified by retrieving such lists from the network model and the inventory model, respectively, generating such lists from the objects represented by the network model and the inventory model, respectively, etc. In another embodiment, the first list of objects and the second list of objects may be defined using extensible markup language (XML), in a unified data model (UDM) format (e.g. a UDM formatted document).

Additionally, synchronizing the network model and the inventory model may include comparing the first list of objects with the second list of objects. For example, the comparison may include comparing a first UDM formatted document storing the first list of objects with a second UDM formatted document storing the second list of objects. Further, synchronizing the network model and the inventory model may include determining any differences between the first list of objects and the second list of objects, based on the comparison. To this end, the synchronization may optionally identify objects of the network as represented by the network model and the inventory model that are different with respect to one another, attributes of such objects that are different with respect to the first list of objects and the second list of objects, etc.

Further, a graphical representation of a variant model associated with the network is generated, utilizing the differences between the network model and the inventory model, the variant model including the network model with the differences between the network model and the inventory model. Note operation 308. With respect to the present description, the variant model may include any model including the network model with (e.g. and a list of) the differences between the network model and the inventory model for which a graphical representation may be generated utilizing such differences. For example, the variant model may include the network model and a list of the differences with respect to the inventory model. Thus, the variant model may be a synchronized model generated from the synchronization of the network model and the inventory model.

In one embodiment, the variant model may be at least a portion of the inventory model (e.g. as identified from an entity for which the method 300 is performed) updated utilizing data (e.g. objects, their attributes, etc.) from the network model identified as different from the inventory model via the synchronization of the network model and the inventory model. To this end, the variant model may optionally only represent a portion of the network for which differences between the network model and the inventory model were identified via the synchronization of the network model and the inventory model. In another embodiment, the differences contained in the variant model may only include those that would be required to update the inventory model to reflect the network model.

Still yet, it should be noted that the graphical representation of the variant model may include any visual depiction (e.g. utilizing icons, etc.) of the variant model. Just by way of example, the graphical representation may include a visualization associated with the network (e.g. as represented by the variant model). As another example, the graphical representation may include a map of objects represented by the variant model.

In one embodiment, the variant model may reflect (e.g. model) a portion of the network represented by objects that are visible within a single context of the network, for example, where the network model is synchronized with the single context of the inventory model. The single context may contain nodes of the network, locations in the network, circuits in the network, services of the network, shelves in the network, slots in the network, cards in the network, ports in the network, etc. Accordingly, the graphical representation may be associated with a particular context of the inventory model.

In an optional embodiment, multiple contexts may exist across the inventory model. One context may include an operational context of the inventory model according to which the network model and the inventory model are compared. Other contexts may include plans or synchronized variants that represent a particular underlying network (e.g. the variant model).

Thus, as described above, a graphical representation of a variant model associated with the network is generated, utilizing the synchronization of the network model and the inventory model. For example, the variant model may be created utilizing the synchronization of the network model and the inventory model, and the graphical representation may be generated from the created variant model. To this end, a graphical representation of a synchronized network model may be generated.

It should be noted that the graphical representation may be generated for a variety of purposes. In one embodiment, the graphical representation may be generated for display to a user [e.g. via a graphical user interface (GUI)]. In another embodiment, the graphical representation may be generated for allowing the user (e.g. to which the graphical representation is displayed) to navigate (e.g. interact with) the visual representation.

In yet another embodiment, the graphical representation may be generated for allowing the user to select the same to automatically update the inventory model utilizing the variant model. For example, such selection may indicate acceptance of the variant model. In still yet another embodiment, the graphical representation may be generated for utilization in designing (e.g. planning, etc.) at least one change in the network. Upon implementation of the change in the network, the network model may be automatically updated to reflect the implemented change.

Optionally, where an original design of the network may optionally be reapplied to the network, a graphical representation may be generated based on the original design of the network. This graphical representation may be used as a target for redesign of a network changed using the above described graphical representation of a synchronized network model.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
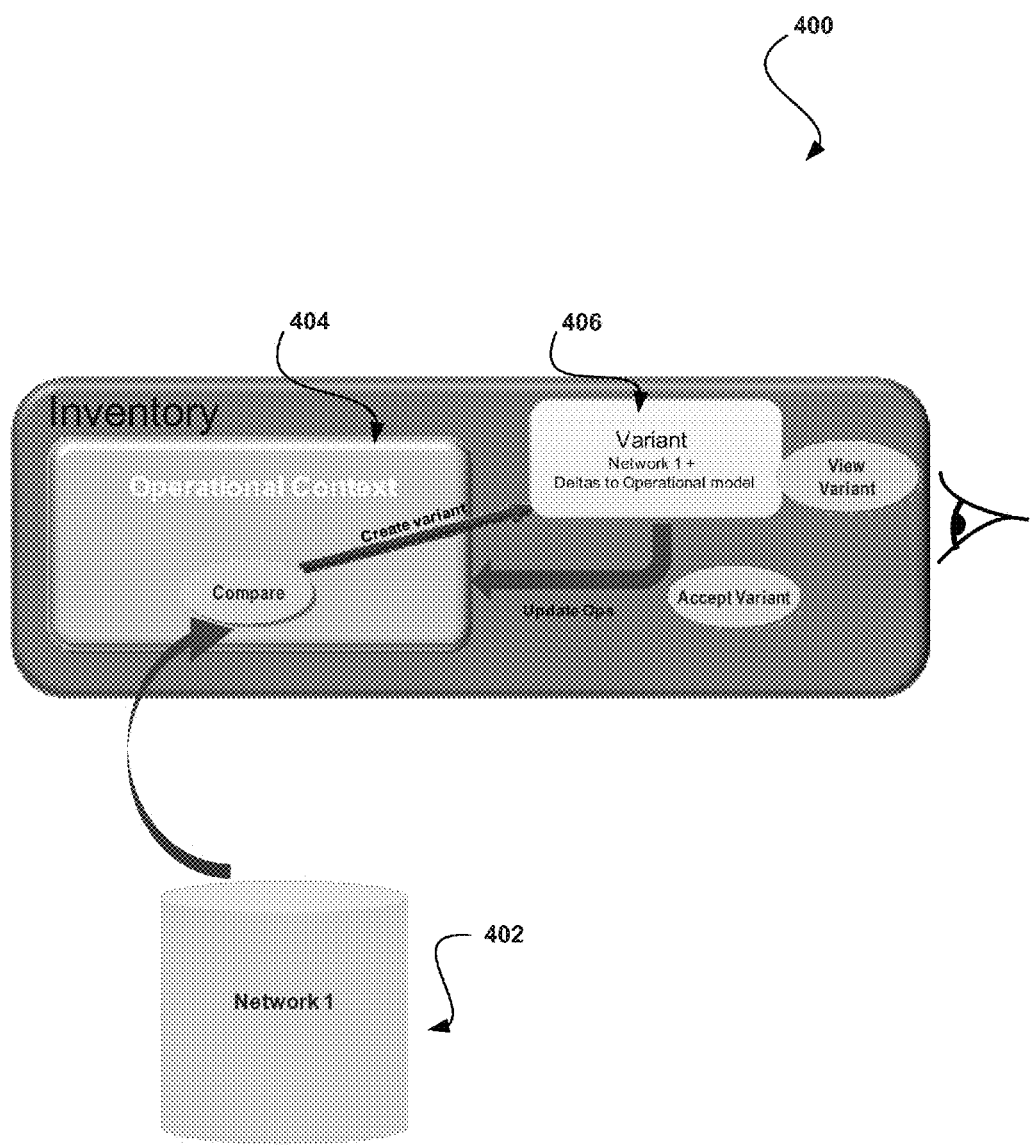
FIG. 4 illustrates a method for generating a graphical representation of at least a portion of a network model synchronized with an operational context, in accordance with yet another embodiment.

FIG. 4 illustrates a method 400 for generating a graphical representation of at least a portion of a network model synchronized with an operational context, in accordance with yet another embodiment. As an option, the method 400 may be carried out in the context of the details of FIGS. 1-3. Of course, however, the method 400 may be carried out in any desired environment. Further, the aforementioned definitions may equally apply to the description below.

As shown, a network model 402 of a network and an operational context 404 of a network inventory are synchronized (e.g. compared as shown). The network model 402 may be received from a first source and the operational context 404 of the network inventory may optionally be received from a second source different from the first source. Accordingly, the network model 402 and operational context 404 of the network inventory may include different models of a single network.

As a result of the synchronization, differences between the network model 402 and the operational context 404 of the network inventory are identified. For example, the differences may include differences in objects existing in the network model 402 and the operational context 404 of the network inventory. The differences are then used to generate a graphical representation of a variant model 406. As shown, the variant model 406 includes the network model 402 with the differences between the network model 402 and the operational context 404 of the network inventory, as identified from the synchronization.

In this way, a user may view the graphical representation of the variant model 408, and may react accordingly. For example, in one embodiment, the user may accept the variant model 406, such that the differences are applied to the operational context 404 of the network inventory. By applying the differences included in the variant model 406, the operational context 404 of the network inventory may be updated to align with the variant model 406.

Figure 5:
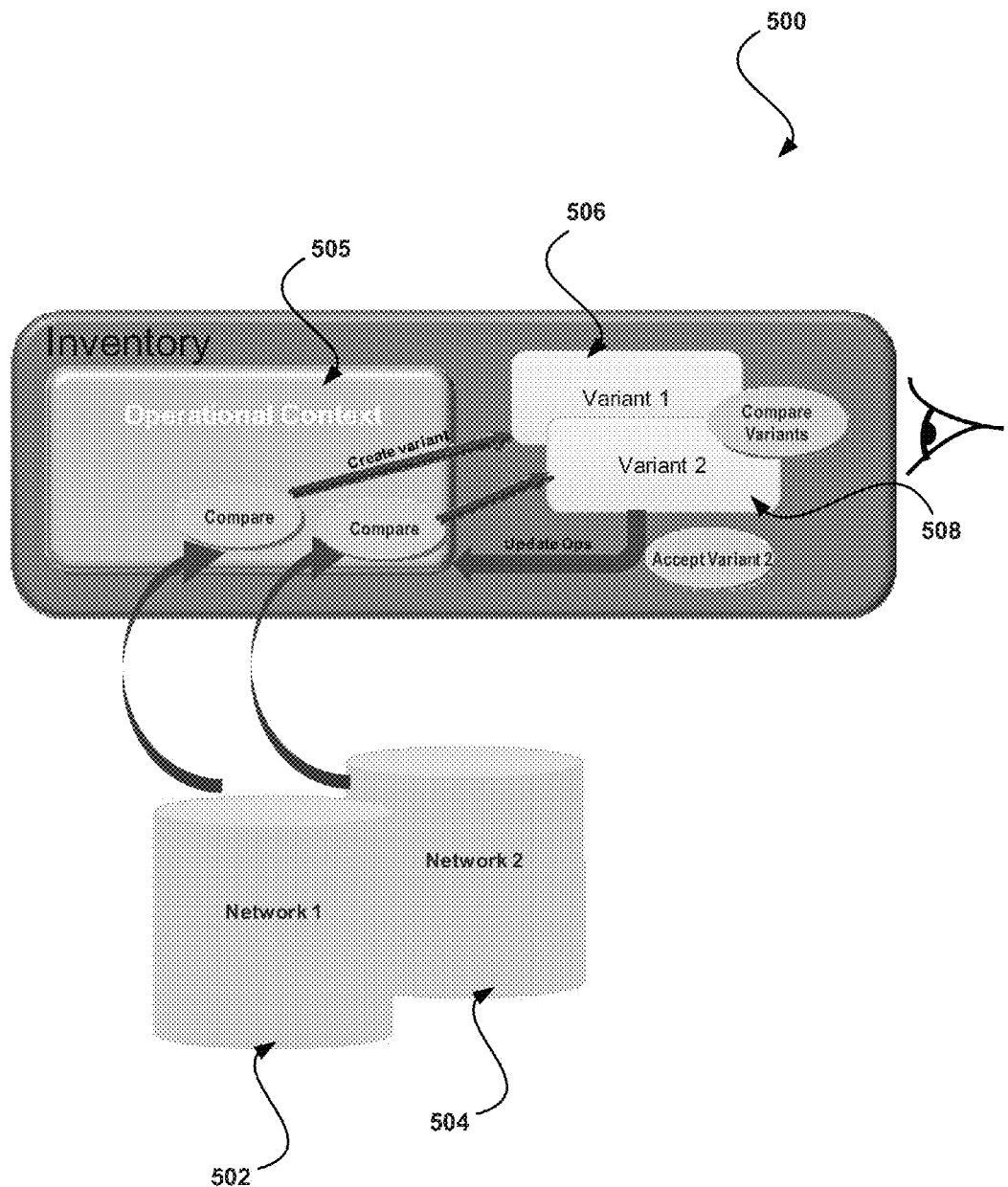
FIG. 5 illustrates a method for updating a network model utilizing one of a plurality of graphical representations, each representative of a different representation of a synchronized network model, in accordance with yet another embodiment.

FIG. 5 illustrates a method 500 for updating a network model utilizing one of a plurality of graphical representations, each representative of a different representation of a synchronized network model, in accordance with yet another embodiment. As an option, the method 500 may be carried out in the context of the details of FIGS. 1-4. Of course, however, the method 500 may be carried out in any desired environment. Further, the aforementioned definitions may equally apply to the description below.

As shown, a first network model 502 of a network is synchronized (e.g. compared as shown) with an operational context 505 of a network inventory. Also, a second network model 504 of the network is synchronized (e.g. compared as shown) with the operational context 505 of the network inventory. The first network model 502 and the second network model 504 may include different representations of a single network. For example, the first network model 502 and the second network model 504 may be identified from different sources. Furthermore, the first network' model 502 and the second network model 504 may be further different from the operational context 505 of a network inventory. Such operational context 505 may include one of various contexts of the network inventory.

As a result of the synchronization between the first network model 502 and the operational context 505 of the network inventory, differences between the first network model 502 and the operational context 505 of the network inventory are identified. For example, the differences may include differences in objects existing in the first network model 502 and the operational context 505 of the network inventory. The differences are then used to generate a graphical representation of a first variant model 506. In the present embodiment, the first variant model 506 includes the first network model 502 with the differences between the first network model 502 and the operational context 505 of the network inventory, as identified from the synchronization between the first network model 502 and the operational context 505 of the network inventory.

Similarly, as a result of the synchronization between the second network model 504 and the operational context 505 of the network inventory, differences between the second network model 504 and the operational context 505 of the network inventory are identified. For example, the differences may include differences in objects existing in the second network model 504 and the operational context 505 of the network inventory. The differences are then used to generate a graphical representation of a second variant model 508. In the present embodiment, the second variant model 508 includes the second network model 504 with the differences between the second network model 504 and the operational context 505 of the network inventory, as identified from the synchronization between the second network model 504 and the operational context 505 of the network inventory.

In this way, the graphical representation of the first variant model 506 and the graphical representation of the second variant model 508 may be displayed to a user. In one embodiment, the user may accept (via selection) the first variant model 506 or the second variant model 508, such that the differences included in the accepted one of the first variant model 506 or the second variant model 508 are applied to the operational context 505 of the network inventory. By applying such differences to the operational context 505 of the network inventory, the operational context 505 of the network inventory may be updated to align with the accepted one of the first variant model 506 or the second variant model 508. For example, in the present embodiment shown, the user accepts the second variant model 508, such that the differences included in the second variant model 508 are applied to the operational context 505 of the network inventory.

Figure 6:
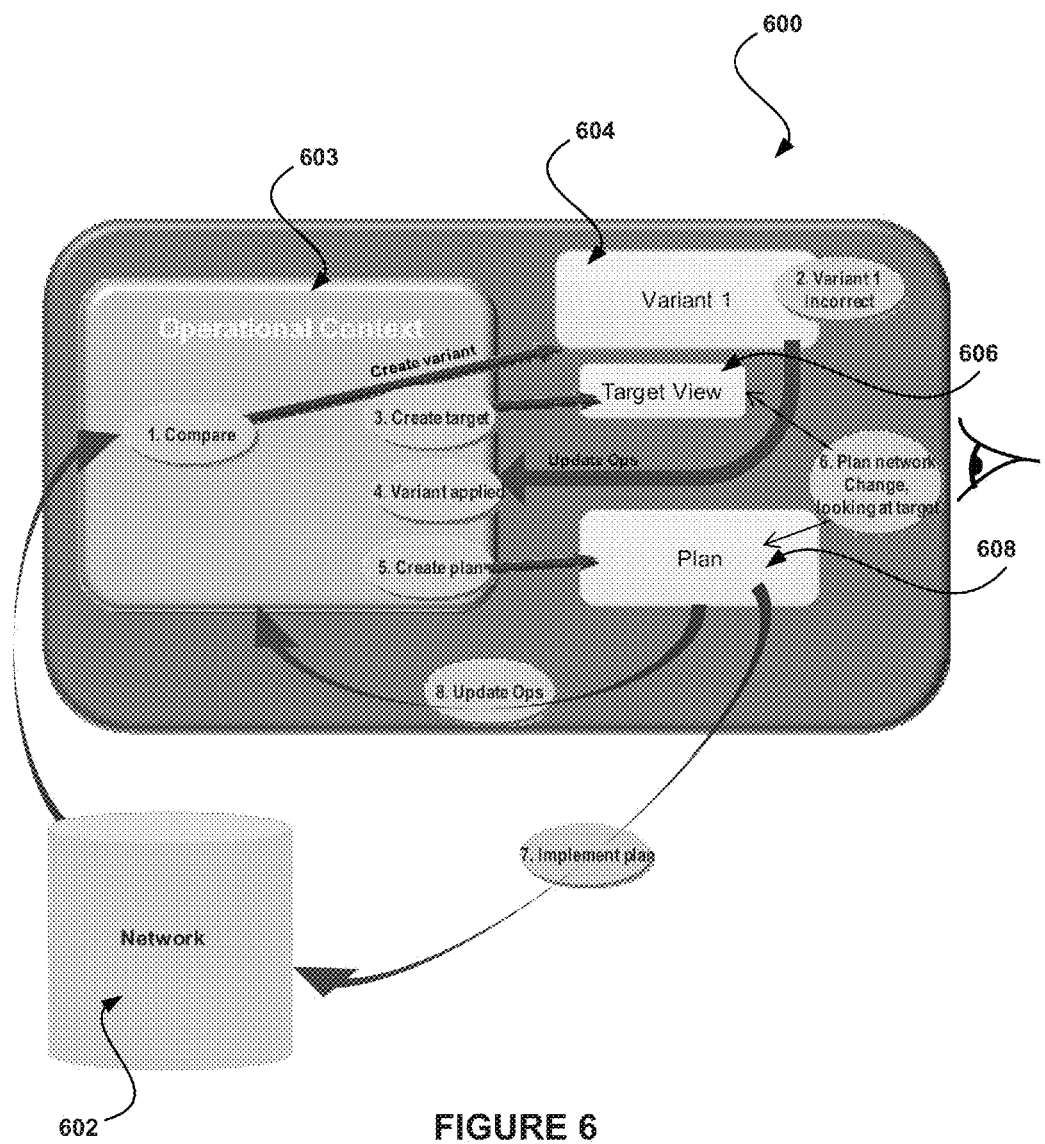
FIG. 6 illustrates a method for designing a change to a network utilizing a graphical representation of at least a portion of a synchronized network model, in accordance with still yet another embodiment.

FIG. 6 illustrates a method 600 for designing a change to a network utilizing a graphical representation of at least a portion of a synchronized network model, in accordance with still yet another embodiment. As an option, the method 600 may be carried out in the context of the details of FIGS. 1-5. Of course, however, the method 500 may be carried out in any desired environment. Again, the aforementioned definitions may equally apply to the description below.

As shown, a network model 602 of a network is synchronized (e.g. compared as shown) with an operational context 603 of a network inventory. As noted above with respect to FIG. 5, the operational context 603 may include one of various contexts of the network inventory.

Based on the synchronization, differences between the network model 602 and the operational context 603 of the network inventory are identified. Further, a variant 604 of the network model 602 is generated using the identified differences. In the present embodiment, the variant 604 includes the network model 602 with the identified differences. A graphical representation of the variant 604 is depicted to a user.

As shown, it is determined from the graphical representation that the network model 602 depicts that the network is in an undesired state and that the network inventory, as modeled via the operational context 603 of such network inventory, holds the desired state of the network. Namely, it is determined that the operational context 603 of the network inventory models a desired implementation of the network 602 which is presently non-existent in the network, such that the operational context 603 of the network inventory is an accurate model of how the network 602 is desired to be implemented. Thus, a target plan 606 is created in response to such determination. In the present embodiment, the target plan 606 may include a copy of a portion of the network inventory.

Furthermore, as shown, the operational context 603 of the network inventory is updated from the variant 604, such that an actual network state is captured in the network inventory. A plan 608 is created by copying the updated network inventory, and the plan 608 is modified to reflect the target plan 606. For example, the plan 608 may be modified to capture the changes that must necessarily be implemented in the network to allow the network to be accurately depicted by the network inventory. The plan 608 is used to modify the network (e.g. by implementing the aforementioned changes in the network), and operations are updated with the changes. Thus, a graphical representation of at least a portion of a synchronized network model may be utilized for designing at least one change in the network 602, for example, as described above.

Figure 7:
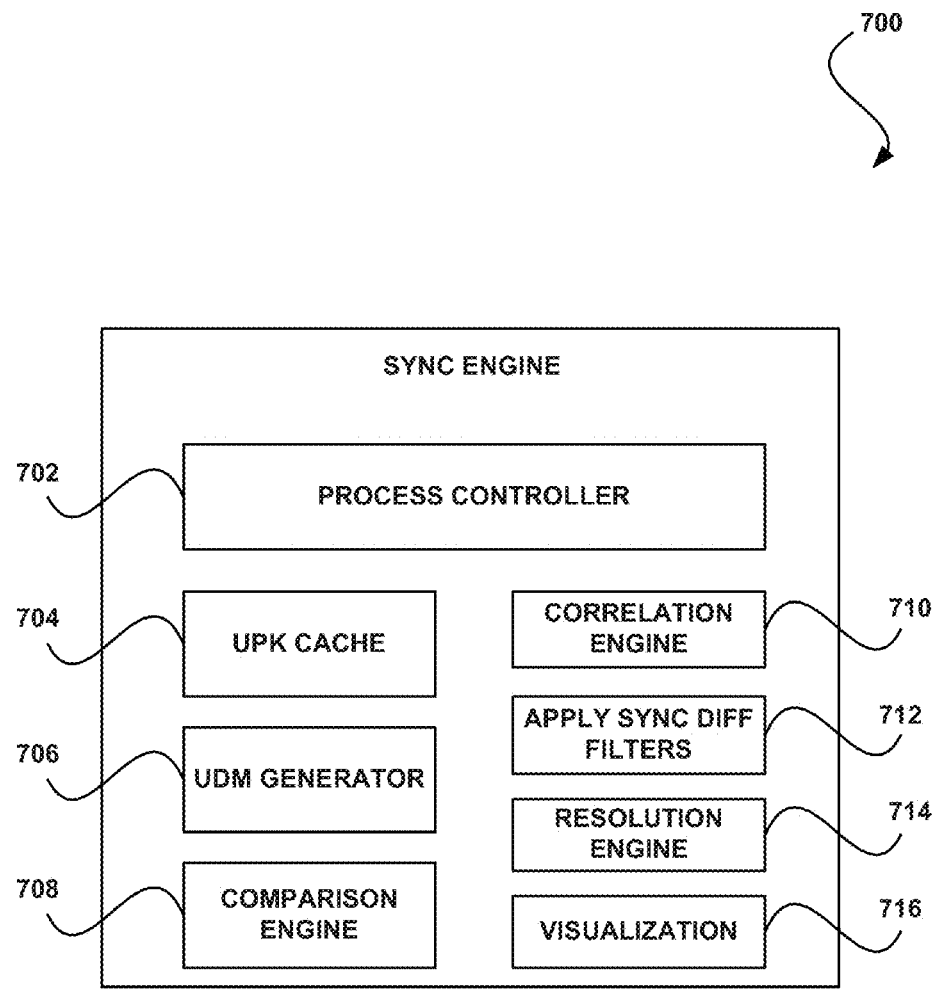
FIG. 7 illustrates a sync engine for synchronizing network models, in accordance with yet another embodiment.

FIG. 7 illustrates a sync engine 700 for synchronizing network models, in accordance with yet another embodiment. As an option, sync engine 700 may be implemented in the context of the details of FIGS. 1-6. For example, the sync engine 700 may be utilized for synchronizing the first model and the second model in operation 306 of FIG. 3. Of course, however, the sync engine 700 may be implemented in any desired environment. Again, the aforementioned definitions may equally apply to the description below.

As shown, the sync engine 700 includes a unique persistent key (UPK) cache 704. The UPK cache 704 generates and maintains mappings of UPKs to unique IDs assigned to an object in a network. Such UPKs may include each include a name assigned to one of the unique IDs. Thus, the UPK cache 704 may receive a UPK or unique ID from a source managing a network model, and may return a unique ID or UPK, respectively, mapped to the received UPK or unique ID. The UPK cache 704 may achieve this by either looking in a cache of the UPK cache 704 or applying any number of matching rules that may be defined in metadata.

The sync engine 700 also includes a UDM generator 706. The UDM generator 706 extracts data from a network model and converts the data to a UDM document containing a list of objects represented by the network model. The UDM generator 706 may generate the UDM document by 1) constructing Structured Query Language (SQL) statements from UDM metadata for extracting the data from the network model; 2) executing the SQL statements against the network model where the data returned is processed into UDM output (e.g. using UDM metadata); 3) converting identifiers of objects included in the extracted data into UPKs utilizing the UPK cache 704; and 4) storing such UPKs in a UDM document.

A comparison engine 708 of the sync engine 700 compares two parsed UDM documents, each generated from a different network model using the UDM generator 706, as described above, to identify differences between the two parsed UDM documents. The differences may includes differences in structures, attributes, etc. of an object included in the network modeled by each of the network models, objects included in one of the network models and missing from the other of the network models, etc.

A correlation engine 710 of the sync engine 700 calculates dependencies between differences identified by the comparison engine 708. Such dependencies may include dependencies between objects associated with the identified differences. Optionally, the dependencies may be utilized for making changes to the network, based on the identified differences, such that the changes may be implemented in an order based on the dependencies.

The sync diff filters 712 of the sync engine 700 may ensure that the dependencies are processed in batches until all of the sync diff filters 712 have been processed during a synchronization process. It should be noted that a process controller 702 of the sync engine 700 may coordinate the interaction of the other components of the sync engine 700 (e.g. UDM generator 706, comparison engine 708, etc.) during the synchronization process.

Moreover, a visualization module 716 is included in the sync engine 700 for generating graphical representations of a newly created network model, utilizing the synchronized network models. For example, the newly generated network model may be created from the differences identified by the comparison engine 708, and at least one graphical representation of such newly generated network model may be generated (e.g. for display, interaction with, etc. a user).

In this way, the sync engine 700 may enable users to synchronize network models maintained by various differences sources. The outcome of a synchronization process of the sync engine 700 may be a graphical representation of a newly generated network model that is created from differences that exist between the network models that are synchronized. Such graphical representation may then be utilized by a user as a visualization of a version of the network, to automatically update one of the network models utilized during the synchronization, to change the network, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:

computer code for identifying a model of an actual state of a network;

computer code for identifying a model of planned changes to the network;

computer code for synchronizing the model of the actual state of the network and the model of the planned changes to the network to identify differences between the model of the actual state of the network and the model of the planned changes to the network, where the synchronizing includes:

identifying a first list of objects from the model of the actual state of the network, where the first list of objects is generated as a unified data model (UDM) document by:

constructing a plurality of Structured Query Language (SQL) statements from UDM metadata for extracting data from the model of the actual state of the network, executing the SQL statements against the model of the actual state of the network, receiving returned data, processing the returned data into UDM output using the UDM metadata, converting identifiers of the objects included in the UDM output into unique persistent keys utilizing a unique persistent key cache, and storing the unique persistent keys in the UDM document;

identifying a second list of objects from the model of the planned changes to the network;

comparing the first list of objects with the second list of objects; and determining a difference between the first list of objects and the second list of objects, based on the comparison;

computer code for generating a graphical representation of a variant model associated with the network, utilizing the differences between the model of the actual state of the network and the model of the planned changes to the network, the variant model including the model of the actual state of the network with the identified differences between the model of the actual state of the network and the model of the planned changes to the network;

computer code for providing, to a user, the graphical representation of the variant model including the model of the actual state of the network with the identified differences between the model of the actual state of the network and the model of the planned changes to the network;

computer code for determining, utilizing the graphical representation of the variant model, that an operational context of the model of the actual state of the network is without an aspect of operation present in the model of the planned changes to the network; and computer code for, in response to the determination that the operational context of the model of the actual state of the network is without the aspect of operation present in the model of the planned changes to the network, creating a first plan and copying a portion of the model of the planned changes to the network to the first plan.

2. The computer program of claim 1, wherein the model of the actual state of the network and the model of the planned changes to the network each include a representation of a plurality of objects in the network.

3. The computer program of claim 1, wherein the computer program is operable such that the model of the actual state of the network is identified from a first source, and the model of the planned changes to the network is identified from a second source.

4. The computer program of claim 1, wherein the variant model includes the model of the actual state of the network and a list of the identified differences with respect to the model of the planned changes to the network.

5. The computer program of claim 1, wherein the variant model models a portion of the network represented by objects that are visible within a single context of the network.

6. The computer program of claim 5, wherein the single context includes at least one of nodes of the network, locations in the network, circuits in the network, services of the network, shelves in the network, slots in the network, cards in the network, and ports in the network.

7. The computer program of claim 5, wherein the single context includes an operational context of the model of the planned changes to the network.

8. The computer program of claim 1, wherein the graphical representation includes a visualization associated with the network.

9. The computer program of claim 1, further comprising computer code for allowing the user to navigate the graphical representation.

10. The computer program of claim 1, further comprising computer code for receiving a selection of the graphical representation, the selection indicating acceptance of the variant model.

11. The computer program of claim 10, further comprising computer code for automatically updating the model of the planned changes to the network utilizing the variant model, in response to the selection.

12. The computer program of claim 1, wherein the computer program is operable such that the graphical representation is utilized for designing at least one change in the network.

13. The computer program of claim 12, wherein upon implementation of the at least one change in the network, the computer program is operable such that the model of the actual state of the network is automatically updated to reflect the implemented change.

14. The computer program of claim 1, wherein the model of the actual state of the network includes a first model of the actual state of the network and the variant model includes a first variant model, and further comprising:

computer code for identifying a second model of the actual state of the network, the second model of the actual state of the network different from the first model of the actual state of the network;

computer code for synchronizing the second model of the actual state of the network and the model of the planned changes to the network to identify differences between the second model of the actual state of the network and the model of the planned changes to the network; and computer code for generating a graphical representation of a second variant model associated with the network, utilizing the differences between the second model of the actual state of the network and the model of the planned changes to the network, the variant model including the second model of the actual state of the network with the differences between the second model of the actual state of the network and the model of the planned changes to the network.

15. The computer program of claim 14, further comprising:

computer code for displaying the graphical representation of the first variant model and the graphical representation of the second variant model to the user;

computer code for receiving a selection of the second variant model from the user; and computer code for automatically updating the model of the planned changes to the network utilizing the second variant model, in response to the selection.

16. The computer program of claim 1, further comprising:
computer code for updating the model of the planned changes to the network utilizing the variant model, such that the model of the planned changes to the network is updated to contain the model of the actual state of the network; and computer code for creating a second plan by copying the updated model of the planned changes to the network, containing the model of the actual state of the network, to the second plan.

17. The computer program of claim 16, further comprising:
computer code for modifying the second plan to reflect the first plan containing the portion of the model of the planned changes to the network, such that the second plan also contains the portion of the model of the planned changes to the network; and computer code for utilizing the modified second plan to modify the network and implement at least one change to the network.

18. The computer program of claim 17, wherein the first plan and the second plan are created and further the second plan is modified in response to a determination, utilizing the variant model and the model of the planned changes to the network, that the network is in an undesired state, and that the model of the planned changes to the network holds a desired state of the network.

19. The computer program of claim 1, wherein the first list of objects from the model of the actual state of the network and the second list of objects from the model of the planned changes to the network each list attributes of the objects contained therein.

20. The computer program of claim 19, wherein determining the difference between the first list of objects and the second list of objects based on the comparison includes identifying a difference between the listed attributes of the objects of the first list and the listed attributes of the objects of the second list.

21. The computer program of claim 1, wherein the unique persistent key cache generates and maintains mappings of the unique persistent keys to the identifiers of the objects.

22. A method, comprising:
identifying a model of an actual state of a network;
identifying a model of planned changes to the network;
synchronizing the model of the actual state of the network and the model of the planned changes to the network to identify differences between the model of the actual state of the network and the model of the planned changes to the network, where the synchronizing includes:
identifying a first list of objects from the model of the actual state of the network, where the first list of objects is generated as a unified data model (UDM) document by:
constructing a plurality of Structured Query Language (SQL) statements from UDM metadata for extracting data from the model of the actual state of the network,
executing the SQL statements against the model of the actual state of the network,
receiving returned data,
processing the returned data into UDM output using the UDM metadata,
converting identifiers of the objects included in the UDM output into unique persistent keys utilizing a unique persistent key cache, and
storing the unique persistent keys in the UDM document;
identifying a second list of objects from the model of the planned changes to the network;
comparing the first list of objects with the second list of objects; and
determining a difference between the first list of objects and the second list of objects, based on the comparison;
generating, using a processor, a graphical representation of a variant model associated with the network, utilizing the differences between the model of the actual state of the network and the model of the planned changes to the network, the variant model including the model of the actual state of the network with the identified differences between the model of the actual state of the network and the model of the planned changes to the network;
providing, to a user, the graphical representation of the variant model including the model of the actual state of the network with the identified differences between the model of the actual state of the network and the model of the planned changes to the network;
determining, utilizing the graphical representation of the variant model, that an operational context of the model of the actual state of the network is without an aspect of operation present in the model of the planned changes to the network; and
creating, in response to the determination that the operational context of the model of the actual state of the network is without the aspect of operation present in the model of the planned changes to the network, a first plan and copying a portion of the model of the planned changes to the network to the first plan.

23. A system, comprising:
a processor for;
identifying a model of an actual state of a network;
identifying a model of planned changes to the network;
synchronizing the model of the actual state of the network and the model of the planned changes to the network to identify differences between the model of the actual state of the network and the model of the planned changes to the network, where the synchronizing includes:
identifying a first list of objects from the model of the actual state of the network, where the first list of objects is generated as a unified data model (UDM) document by:
constructing a plurality of Structured Query Language (SQL) statements from UDM metadata for extracting data from the model of the actual state of the network,
executing the SQL statements against the model of the actual state of the network,
receiving returned data,
processing the returned data into UDM output using the UDM metadata,
converting identifiers of the objects included in the UDM output into unique persistent keys utilizing a unique persistent key cache, and
storing the unique persistent keys in the UDM document;
identifying a second list of objects from the model of the planned changes to the network;

comparing the first list of objects with the second list of objects; and determining difference between the first list of objects and the and second list of objects, based on the comparison;

generating a graphical representation of a variant model associated with the network, utilizing the differences between the model of the actual state of the network and the model of the planned changes to the network, the variant model including the model of the actual state of the network with the identified differences between the model of the actual state of the network and the model of the planned changes to the network;

providing, to a user, the graphical representation of the variant model including the model of the actual state of the network with the identified differences between the model of the actual state of the network and the model of the planned changes to the network;

determining, utilizing the graphical representation of the variant model, that an operational context of the model of the actual state of the network is without an aspect of operation present in the model of the planned changes to the network; and creating, in response to the determination that the operational context of the model of the actual state of the network is without the aspect of operation present in the model of the planned changes to the network, a first plan and copying a portion of the model of the planned changes to the network to the first plan.

24. The system of claim 23, wherein the processor is coupled to memory via a bus.

* * * * *

UNITED STATES PATENT AND TRADEMARK OFFICE
CERTIFICATE OF CORRECTION

| | | |
|---|---|---|
| PATENT NO. | : 8,839,114 B1 | Page 1 of 1 |
| APPLICATION NO. | : 12/834851 | |
| DATED | : September 16, 2014 | |
| INVENTOR(S) | : Glendinning et al. | |

It is certified that error appears in the above-identified patent and that said Letters Patent is hereby corrected as shown below:

In the claims:

Col. 13 line 03, please replace "determining difference" with --determining a difference--;

Col. 13 line 04, please replace "the and second" with --the second--.

Signed and Sealed this
Twenty-first Day of April, 2015

Michelle K. Lee
*Director of the United States Patent and Trademark Office*